United States Patent [19]

Colling

[11] Patent Number: 4,786,308
[45] Date of Patent: Nov. 22, 1988

[54] GROWTH MEDIUM, AND A METHOD FOR PRODUCING THE SAME

[76] Inventor: Knut Colling, Heggedalsveien 153, N01380 Heggedal, Norway

[21] Appl. No.: 56,639

[22] Filed: Jun. 2, 1987

[30] Foreign Application Priority Data

Jun. 2, 1986 [NO] Norway ................................ 862182

[51] Int. Cl.⁴ ........................ C09K 3/00; C05F 11/02
[52] U.S. Cl. ........................................ 71/24; 71/31; 71/62; 71/64.01; 71/904
[58] Field of Search .................. 71/24, 31, 62, 64.01, 71/904

[56] References Cited

U.S. PATENT DOCUMENTS

| | | |
|---|---|---|
| 3,369,884 | 2/1968 | Barron ................................ 71/24 |
| 3,573,892 | 4/1971 | Atkins ................................ 71/24 |
| 3,617,237 | 11/1971 | Nagasawa ......................... 71/24 |
| 3,645,714 | 2/1972 | Heming et al. ..................... 71/24 |
| 3,744,986 | 7/1973 | Grosse-Brauckmann et al. .... 71/24 |
| 3,844,759 | 10/1974 | Ruel et al. ......................... 71/24 |
| 4,321,076 | 3/1982 | Firth, Jr. ............................ 71/24 |

FOREIGN PATENT DOCUMENTS 2459269 6/1976 Fed. Rep. of Germany ......... 71/24

Primary Examiner—William R. Dixon, Jr.
Assistant Examiner—Andrew B. Griffis
Attorney, Agent, or Firm—Browdy and Neimark

[57] ABSTRACT

The growth medium consists of a homogeneous mixture of short rockwool fibres, and short vegetable fibres, preferably peat fibres. Humus material may be added, preferably composted sludge. To the mixture may also be added fertilizer, and seeds, e.g. grass seeds being bound to said fibres by a rapidly disintegrating binder.

The method for producing said growth medium comprises intimately mixing long rockwool fibres, and vegetable fibres, preferably peat fibres, and possible additional materials in a dry state in a mixer until homogenous spheres or balls are formed which contain the components in a substantially uniform mixture, and cutting said spheres into short fibres by the aid of beating knives, a hammer mill or the like, and then conveying said medium to the growing site or to a packaging by the aid of an air jet.

6 Claims, 1 Drawing Sheet

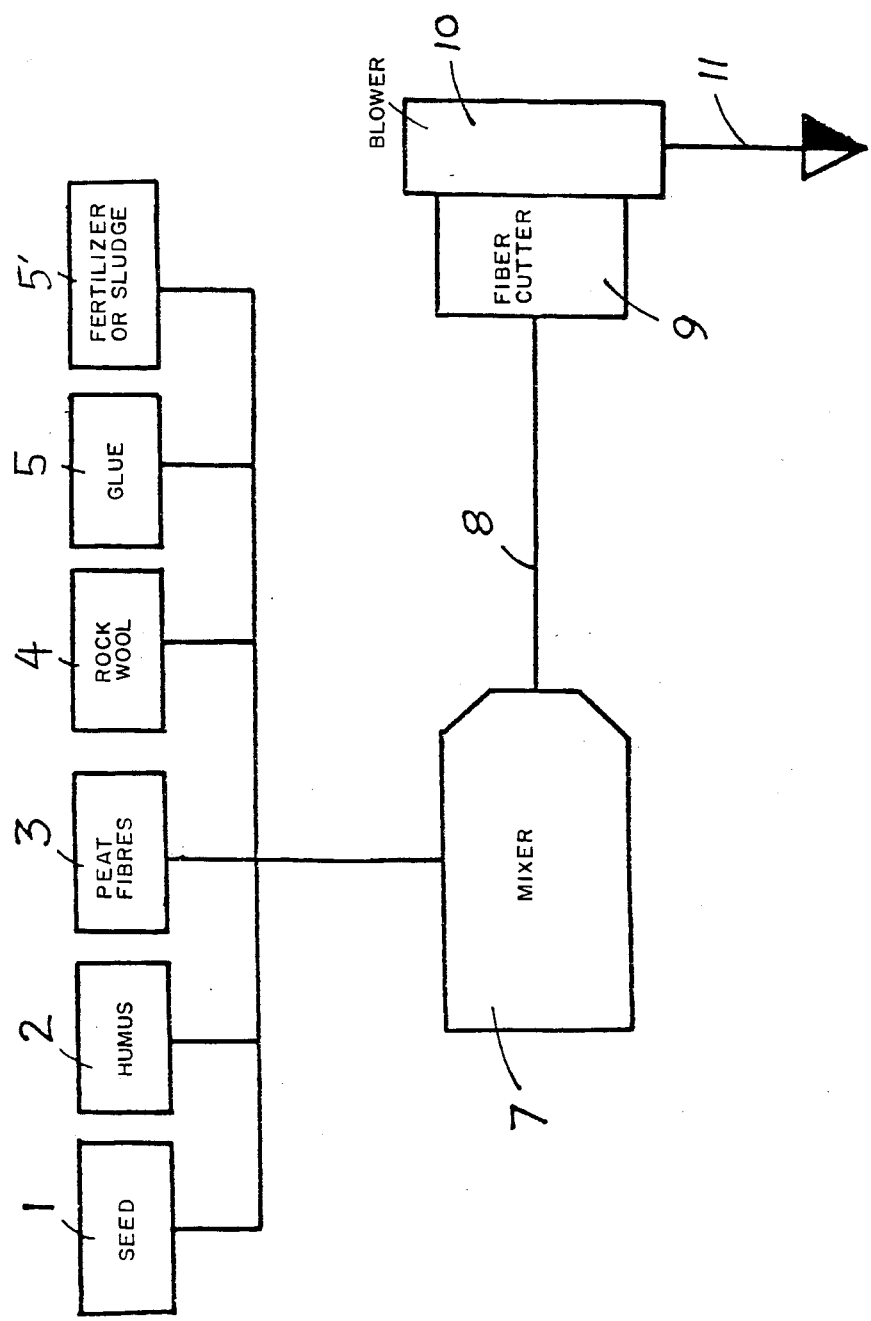

GROWTH MEDIUM, AND A METHOD FOR PRODUCING THE SAME

The present invention relates to a growth medium for plants, e.g. grass, etc., and a method for producing such a growth medium.

The natural growth medium for plants, e.g. grass and the like is humus soil. The definition of a growth medium is, presently extended to include a non-vegetabilic medium which exclusively or mainly functions as a support for the root system of a plant, necessitating nutrients to be added from another source or from the growth medium. Such growth media are, presently, used in green houses for cultivation of salad, cucumbers, tomatoes, etc. The most commonly used growth medium at present is rockwool especially produced to this end. Rockwool is then placed in a vessel which is filled with water to a certain level. To the water plant nutrients are added and the water is commonly circulated in the plant vessels or plant trough with continuous control and addition of nutrients, etc.

As regards growth medium out of doors only the original growth medium could previously be used, since it was not possible out of doors to add nutrients to the root system with flowing water. When it is desired to lay out a lawn, cover a slope, etc. it was previously necessary to use a humus containing material.

In our modern societies there is much demand of being able to cover ugly patches in the terrain with rough turf. It may be a question of slope at the side of a road where blasting was done, ugly patches in the terrain after digging or blasting in connection with construction work, etc. It will, furthermore, be desirable to cover the terrain with a growth medium and sow grass when slalom courses, golf courses, flood-lit tracks and the like are made.

Spreading soil or the like as was previously necessary, is very labour demanding, as readily understood. Another disavantage is that in dry weather and with strong winds the soil or similar material can be blown away before the grass germinates and secures the material with its root system. On slopes the material will readily be washed away with heavy rain, at least in places where creek beds naturally form.

It will readily be understood that it would be very advantageous if the medium could be supplied by blowing a jet of growth medium particles. The medium must be very dry to be blown by the aid of a blower. With the material previously known this would cause the material to spread in an entirely uncontrolled manner, especially if there were windy conditions when the material was blown. Afterwards the material would also show the same disadvantages as described above as regards erosion by wind and water.

It is an object of the present invention to provide a growth medium which may be placed by the aid of a concentrated air jet, quite in the manner of a growth medium jet carried by air and in such a manner that the above mentioned disadvantages are avoided and particles are prevented from blowing away when they are deposited and are not as much subject to erosion as before.

According to the invention this is achieved by the aid of a growth medium consisting of a homogeneous mixture of short rockwool fibres and short vegetable fibres, preferably sphagnum or peat fibres.

Further features will appear from the dependent claims.

The method for producing the growth medium according to the invention is characterized by the fact that long rockwool fibres and vegetable fibres, preferably peat fibres, and possibly with an addition of humus material, preferably composted sludge in a dry state, as well as a quickly disintegrating binder, if desired, are thoroughly mixed in a mixer to form homogeneous spheres or balls, that the latter are cut to form short fibres by the aid of rotating beating knives in a hammer mill or the like, and that the medium is then supplied to the growing site, or to a packing material by the aid of an air jet.

Experiments were made with the growth medium according to the invention with air borne positioning. The rockwool fibres and peat fibres in a mixer proved to mix intimately at first and then quite rapidly formed spheres or balls. Such spheres are quite bulky at first, but with continued rotation in the mixer they are densified to comparatively small and hard spheres. In the experiment these spheres were supplied to a fibre cutter of the kind that is used for cutting rockwool fibres for blowing rockwool into walls, etc. in old non-insulated houses. By the aid of a strong blower the particulate medium was then blown onto an area that was partly covered with blasted rocks. The experiment showed that during positioning of the growth medium it practically did not tend to blow away. The positioned material was firmly compressed and did not tend much to blow away even in a strong wind. The growth medium had been mixed with grass seed and fertilizer. Grass germinated more rapidly than in a natural growth medium, and later growth was stronger.

Pot experiments were also carried out both with grass and other plants and with very good results.

What is surprising in the invention is the strong binding occurring in the medium. Microscopy of the medium shows that the rockwool fibres cut in the manner disclosed above, i.e. by beating knives or the like, receive a very splintery surface of cut. The splintery fragments of rockwool fibres have a crooked structure and will hook up with other rockwool fibres as well as peat fibres. Thus, the fibres act like burdock spikes and the growth medium is very cohesive. It turned out that the splintery rockwool fibres are very cohesive with other humus materials as well, especially with composted sludge, a material also having a fibrous structure. A very useful material is sludge treated according to the applicant's method, with activated sludge being directly placed for drying beneath a tight cover, i.e. without any anaerobe decomposition taking place before drying.

The invention is disclosed in more detail below with reference to the drawing which shows a diagrammatical embodiment of an apparatus for carrying out the method according to the invention.

The material, e.g. rockwool, peat fibres, humus, glue, seed, fertilizer, is supplied from containers or tanks 1, 2, 3, 4, 5, 5' via a pipeline 6 to a mixer 7. In a simple test equipment the mixer consists of a rotating cement mixer. When the material treated in the mixer forms spheres or balls, these spheres or balls are supplied to fibre cutting means 9 via pipeline 8. Rotating knives cut the fibres here, into short pieces which are fed continuously to blower 10 blowing the growth medium out through a pipeline 11.

Even though the growth medium disclosed above is first and foremost described for use as a means for forming covering vegetation on wounds in nature, slopes along roads, power in gardens, parks, athletics grounds and other green areas, etc. those skilled in the art will obviously understand that this medium may also be used in connection with cultivation of other cultivated plants. It is also possible that said medium may be used for a winter cover for various kinds of horticultural plants, e.g. in connection with application of a more or less watertight film. Instead of peat fibres other vegetable fibres may be used, e.g. bark fibres, defibrated wood material, defibrated sugar cane residues, and the like.

Having described my invention, I claim:

1. A method for providing a growth medium for grass and other plants, comprising the steps of:

mixing long rockwool fiber and vegetable fibers intimately in a dry state until spheres are formed, said spheres containing said materials in an essentially homogenous mixture, cutting said spheres to form a cut medium, and air jetting the cut medium to a destination.

2. The method of claim 1, wherein said destination is a package.

3. The method of claim 1, wherein said destination is a growing site.

4. The method of claim 1, wherein fertilizer, humus material and grass seed are mixed with said fibers in said mixing step.

5. The method of claim 1, wherein said spheres are cut by beating knives.

6. The method of claim 1, wherein said spheres are cut in a hammer mill.

* * * * *